United States Patent
Sarker

(10) Patent No.: US 8,805,457 B2
(45) Date of Patent: Aug. 12, 2014

(54) DYNAMIC BATTERY CAPACITY ALLOCATION FOR DATA RETENTION AMONG MOBILE COMPUTERS AND ELECTRONIC DEVICES

(75) Inventor: Ataul Sarker, Holtsville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 57 days.

(21) Appl. No.: 13/592,392

(22) Filed: Aug. 23, 2012

(65) Prior Publication Data

US 2012/0324252 A1 Dec. 20, 2012

Related U.S. Application Data

(62) Division of application No. 11/948,892, filed on Nov. 30, 2007, now Pat. No. 8,396,515.

(51) Int. Cl.
*H04M 1/00* (2006.01)
*H04B 1/38* (2006.01)

(52) U.S. Cl.
USPC ............... 455/574; 455/127.3; 455/343.5; 455/343.6; 711/170

(58) Field of Classification Search
USPC ............ 455/574, 127.3, 343.5, 343.6, 522, 455/343.1, 343.2, 66.1, 67.11, 557, 127.1; 365/26, 63, 52, 226, 227, 225; 711/170, 104, 105, 154; 710/104, 302; 713/320, 321; 9/574, 127.3, 343.5, 9/343.6, 522, 343.1, 343.2, 66.1, 67.11, 9/557, 127.1
See application file for complete search history.

(56) References Cited

U.S. PATENT DOCUMENTS

| | | | |
|---|---|---|---|
| 6,681,286 B2 | 1/2004 | Chang et al. | |
| 6,904,506 B2 * | 6/2005 | Wu et al. | 711/170 |
| 7,050,798 B2 * | 5/2006 | Ranta | 455/423 |
| 7,127,622 B2 * | 10/2006 | Schnepper | 713/300 |
| 7,536,573 B2 * | 5/2009 | Schumacher et al. | 713/320 |
| 7,702,935 B2 * | 4/2010 | Cornwell et al. | 713/320 |
| 7,715,189 B2 | 5/2010 | Iida et al. | |
| 7,796,457 B2 | 9/2010 | Hsu et al. | |
| 7,813,208 B2 | 10/2010 | Hsu et al. | |
| 7,817,487 B2 | 10/2010 | Hsu et al. | |
| 7,911,509 B2 | 3/2011 | Jendbro | |
| 7,912,517 B2 | 3/2011 | Park | |
| 8,060,154 B1 * | 11/2011 | Bali et al. | 455/574 |
| 8,171,318 B2 * | 5/2012 | Cornwell et al. | 713/320 |

OTHER PUBLICATIONS

Ex Parte Quayle Action mailed on Sep. 11, 2012 in United States counterpart U.S. Appl. No. 11/948,892, Ataul Sarker, filed Nov. 30, 2007.
Non Final Office Action mailed on May 23, 2012 in United States counterpart U.S. Appl. No. 11/948,892, Ataul Sarker, filed Nov. 30, 2007.
Notice of Allowance mailed on Oct. 18, 2012 in United States counterpart U.S. Appl. No. 11/948,892, Ataul Sarker, filed Nov. 30, 2007.

* cited by examiner

*Primary Examiner* — Pablo Tran

(57) ABSTRACT

Systems devices and/or methods that facilitate dynamic battery capacity allocation are presented. Extended use times or smaller form factors can be achieved for devices employing dynamic battery capacity allocation. By determining factors that can include the type of memory, the usage of the memory, and/or the user's preference to continue to use a device rather than retain data in a volatile memory for a period of time before supplying alternative power, the device can be available for use for longer periods of time on a battery or a smaller battery can be used to achieve similar use time.

15 Claims, 11 Drawing Sheets

DYNAMIC BATTERY CAPACITY ALLOCATION FOR DATA RETENTION AMONG MOBILE COMPUTERS AND ELECTRONIC DEVICES

TECHNICAL FIELD

The subject innovation relates generally to battery capacity allocation controllers, methods, and/or systems and more particularly to dynamic battery capacity allocation controllers, methods, and/or systems for enablement of data retention in a mobile computer/device.

BACKGROUND

Traditionally, battery capacity allocation in mobile electronic devices (e.g., PDAs, cellular telephones, laptop computers, ...) could be implemented by preserving a predetermined portion of the maximum battery capacity. Preserving a set portion of the battery capacity could provide sufficient power to the device in a low-power state to retain data for a reasonable time in volatile memories related to the mobile electronic device such that the device could be connected to an alternative power supply. For example, a PDA can switch to a low-power state (e.g., the device appears to turn off to the end user) when the battery reaches 50% of the total battery capacity. This can preserve data in the PDAs volatile memory for a period of time, for example 72-hours, such that there is sufficient time to recharge the PDA or switch batteries in the PDA.

Generally, information can be stored and maintained in one or more of a number of types of storage devices, such as memory devices. Memory devices can be subdivided into volatile and non-volatile types. Volatile memory devices generally lose their information if they lose power and typically require periodic refresh cycles to maintain their information. Volatile memory devices include, for example, random access memory (RAM), dynamic RAM (DRAM), static RAM (SRAM), and the like. Non-volatile memory devices can maintain their information whether or not power is maintained to the memory devices. Non-volatile memory devices include, but are not limited to, flash memory, read only memory (ROM), programmable ROM (PROM), erasable PROM (EPROM), electrically erasable PROM (EEPROM), non-volatile RAM, and the like.

Therefore, traditional battery capacity allocation results in, for example, only 50% of the battery capacity being available to the end user of the device for normal mode operations (e.g., making cell phone calls, checking stock prices on a PDA, ...). This can be true even where the end user readily has an alternative power supply available (e.g., a second battery, among others). Thus, current battery capacity allocation can create inefficiencies in battery use.

For example, where a user has a second battery available for a PDA, where the first battery drops to 50% capacity, the user must switch batteries to continue to work on the device (e.g., at 50% the device goes into low power mode to preserve volatile memory data). This is true even though the user does not need, for example, 72 hours to switch the batteries. Thus, the user can lose up to 50% of available battery capacity. Where a user could alternatively allow the battery to drop to, for example, 0.1% of capacity before switching batteries, the 0.1% capacity could retain volatile memory data for the several minutes the user might need to switch batteries. This can result in use of, for example, 99.9% of the battery capacity as compared to 50% of the battery capacity under conventional battery allocation.

Recently, some mobile device operating systems (e.g., Microsoft™ Windows Mobile 5.0™ OS, among others) have implemented support for persistent storage technologies. Persistent storage employs some nonvolatile device memory (e.g., flash memory) to prevent the loss of data when the battery is completely drained. Where an operating system supports persistent memory, the battery capacity can be allowed to run to a much lower portion of overall battery capacity because there is both less power consumption (e.g., lower power consumption requires less battery capacity to maintain data for a 72 hour period) and less fear that when battery capacity reaches 0% that there will be large data losses (e.g., where all data is stored in nonvolatile memory, a loss of all power does not result in memory loss). Systems and methods that can interact with operating systems that support persistent storage can further improve battery capacity by allowing a battery to run to 0% capacity where there will be no loss of data as a result of employing nonvolatile memory in the device.

The use of portable computer and electronic devices has greatly increased demand for high capacity batteries. Digital cameras, digital audio players, personal digital assistants, and the like, generally seek to employ high capacity batteries (e.g., evolution from alkaline to Li Ion batteries, among others). By better managing battery capacity allocation, more capacity can be efficiently used without increasing the size of a battery or, alternatively, a smaller sized efficiently allocated battery can supply similar capacity to larger conventionally allocated batteries. It is desirable to create systems and methods for facilitating improved battery capacity allocation.

SUMMARY

The following presents a simplified summary of the subject innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

Conventionally, systems with finite power supplies (e.g., batteries, capacitors, and the like) reserve a portion of the power capacity to power memories to facilitate retaining data in anticipation of replenishment of the finite power supply or substitution of an alternative power supply (e.g., recharging batteries, replacing batteries, plugging into a mains supply, ...). Where finite power supplies (FPSs) reserve capacity, the device employing the FPS will generally be placed in a condition where it is unavailable for use by the device end user (e.g., a PDA can turn off to conserve battery power to retain data stored in a volatile memory, among others). Replenishing the FPS or employing an alternate power source typically allows the device to be available to the end user (e.g., changing the batteries in a PDA can allow the end user to turn the device on and use it again.) Where allocation of reserve capacity is not employed, running a device until the FPS is exhausted can result in data loss from volatile memories (e.g., where a PDA is used until the battery is exhausted insufficient power can be available to retain data stored in, for example, a SRAM memory core.) Further, where allocation of reserve capacity is employed, the capacity available for powering the device for end user interaction can be significantly reduced (e.g., a device can reserve, for example, 50% of battery capacity for data retention, leaving only 50% of the battery capacity to run the device) or alternatively the form factor of the device and FPS can be unnecessarily large (e.g., a larger battery can be used, for example, a 1300 mAh battery can be used in a reserve battery capacity allocation system to give the same useable device time as a smaller footprint 800 mAh battery in a system without reserve battery capacity allocation).

Reserving power capacity in systems with volatile memory is a valuable technique to preserve data by preventing the user from sufficiently depleting the FPS to the point where data can be lost. However, conventional reserve capacity systems typically reserve enough capacity to preserve data for an industry standard amount of time, for example 72 hours. Where an end user can replenish or replace the FPS sooner, the excess reserve capacity can be considered wasted because the end user could have used that power capacity for use of the device. For example, where a cell phone reserves enough power capacity for 72 hours and the user has a second battery immediately available, the cell phone would only need to reserve a few minutes of battery capacity to allow the user to swap batteries and thus, more than 71 hours of battery capacity become unavailable to the user of the device. Alternatively, for example, where the user has a second battery available, the first battery could be of a smaller form factor because the portion of the battery having the reserved 72 hours of capacity is not needed where the second battery is readily available.

Not all memory systems need power to retain data (ROM, flash memory, . . . ) and thus may not benefit from having reserve power capacity allocated for maintaining data in a memory. For example, where a cell phone uses flash memory to store data, depleting the battery generally will not result in data loss from the flash memory. Therefore, there is no particular benefit to reserving battery capacity in systems employing nonvolatile memories.

Even where devices or systems employ volatile memories, improved dynamic allocation of FPS capacity can improve the useable time of the device or system. Where a user can dynamically select reserve power capacity, this can result in more user time for a device or system or allow a smaller form factor for the FPS powering the user deice or system. For example, where the user can select only 5 minutes of reserve capacity because they are near a mains power supply for replenishment of the FPS, the user can use the power capacity to use the device in contrast to, conventionally, allocating that power capacity for preserving data in a volatile memory, for example, for 72 hours. Further, a smaller FPS could have been used in the above example.

In accordance with one aspect of the disclosed subject matter, a dynamic capacity allocation component can be employed to improve the useable power capacity of a FPS by allowing a user to run a device longer at the expense of depleting the amount of time the device will retain data in a volatile memory. For example, a user can be notified that a battery has sufficient capacity to retain data, for example, for 72 hours and that continuing to use the device will reduce that time. As the user continues to use the device the device can later notify the user that the battery has sufficient capacity to retain data, for example, for 48 hours and that continued use will reduce this time. Still later, the device can notify the user that the battery has sufficient capacity to retain data, for example, for 1 hour and that continued use will reduce this time. The user can then decide to stop using the device (e.g., power down the device to preserve the remaining capacity for data retention in a volatile memory) and replenish the battery or exchange the battery for a charged one within the 1 hour exemplary time frame. For example, using a PDA to map a route to a hotel and expecting to arrive well before 72 hours had elapsed a user thus selects to use the reserve battery capacity to navigate to the hotel. Upon arriving at the hotel the PDA can be plugged into mains power to replenish the PDA battery without losing data.

In accordance with another aspect of the disclosed subject matter, a dynamic capacity allocation component can facilitate improved useable power capacity of a FPS by allowing a user to run a device longer where data is not stored in a volatile memory. For example, where a PDA employs nonvolatile memory (e.g., flash memory, among others) a dynamic capacity allocation component can allow the battery to be used to complete depletion because data in a nonvolatile memory will not be lost when the battery becomes drained. For example, where a digital camera stores pictures on a flash memory, a dynamic capacity allocation component can allow the battery to be used with no reserve capacity because pictures on the flash memory will not be lost when the battery becomes drained.

In accordance with another aspect of the subject innovation, smaller form factor FPSs can be used where dynamic capacity allocation is employed. For example, a smaller form factor battery can be used where the user can determine how much reserve capacity to preserve for data retention because allocation of reserve capacity is more optimized to individual user situations and usage conditions. Similarly, longer usage time can be expected from standard form factor FPSs as discussed herein.

In accordance with another aspect of the subject innovation, where both volatile and nonvolatile memories are employed in a device, dynamic capacity allocation can facilitate improved user times. User times can be improved by, for example, employing user interaction as discussed herein in regard to dynamic capacity allocation with volatile memories and by relaying dynamic power capacity allocation information to a user device or system. Relaying dynamic power capacity allocation information the user device or system can employ nonvolatile memory in place of volatile memory (e.g., a PDA can normally use faster volatile memory but can switch to slower nonvolatile memory where the cost of slower performance is outweighed by the user's desire to continue using the device into the reserve power capacity of the FPS) to allow a device to be used longer, for example, to FPS depletion. Further, dynamic power capacity allocation can interactively communicate with user devices or systems to improve FPS utilization. For example, where a user device is actively employing volatile memory, more time (e.g., more FPS capacity) can be allocated to data retention, and as the user, for example, stores the data from volatile to nonvolatile memory, the FPS capacity can be reallocated to extend user time (e.g., the previously allocated capacity can be reallocated as useable capacity).

In accordance with an aspect of the subject innovation, an inferential component can facilitate FPS utilization by inferring, for example, how much capacity to allocate to data retention based at least in part on, for example, prior device usage by one or more users, data/device/user semantics (e.g., amount of data, type of data, redundancy of data, prior data losses, ambient temperatures, battery performance, location of the user or device and/or proximity to known alternative power supplies, availability of secondary FPSs, or combinations thereof, among many others), user interactions, progress of a process (e.g., determining allocation based in part on how far along in a process the user, device, or system is), or combinations thereof, among others. For example, where a user is driving in cold weather to a hotel and using a PDA with mapping capacity to get there, the inferential component can consider, among others, that the cold weather can reduce battery performance, that the loss of the map is not likely to be significantly detrimental to the user, that the mapping service is likely significantly important to the user so that the user doesn't have to sleep in the car, that the user is close to the destination, and that the destination will likely have mains power to recharge the FPS.

Continuing with the example, based on these considerations the inferential component can communicate with the device and indicate that some data be moved to nonvolatile memory to prevent loss, that some data be kept in volatile memory because device performance is important (e.g., data related to when and where to make turns to get to the hotel is performance sensitive if turns are not to be missed) and further, can automatically allocate, based on inferences, less reserve capacity for data retention because loss of the turn by turn data is not likely critical to the user (e.g., it can be replaced at a later time without difficulty), that it is important to the user to use the device to get to the hotel, that the user will likely recharge the battery soon after arriving at the hotel, and that the hotel is likely close enough that capacity will be replenished sooner than, for example, a 72 hour reserve capacity. In contrast, a conventional capacity allocation could, for example, leave the motorist stranded in a cold snowy night by turning off the PDA to retain battery capacity to preserve mapping data for 72 hours.

To the accomplishment of the foregoing and related ends, the innovation, then, comprises the features hereinafter fully described and particularly pointed out in the claims. The following description and the annexed drawings set forth in detail certain illustrative embodiments of the innovation. These embodiments can be indicative, however, of but a few of the various ways in which the principles of the innovation can be employed. Other objects, advantages, and novel features of the innovation will become apparent from the following detailed description of the innovation when considered in conjunction with the drawings.

DETAILED DESCRIPTION

Figure 1:
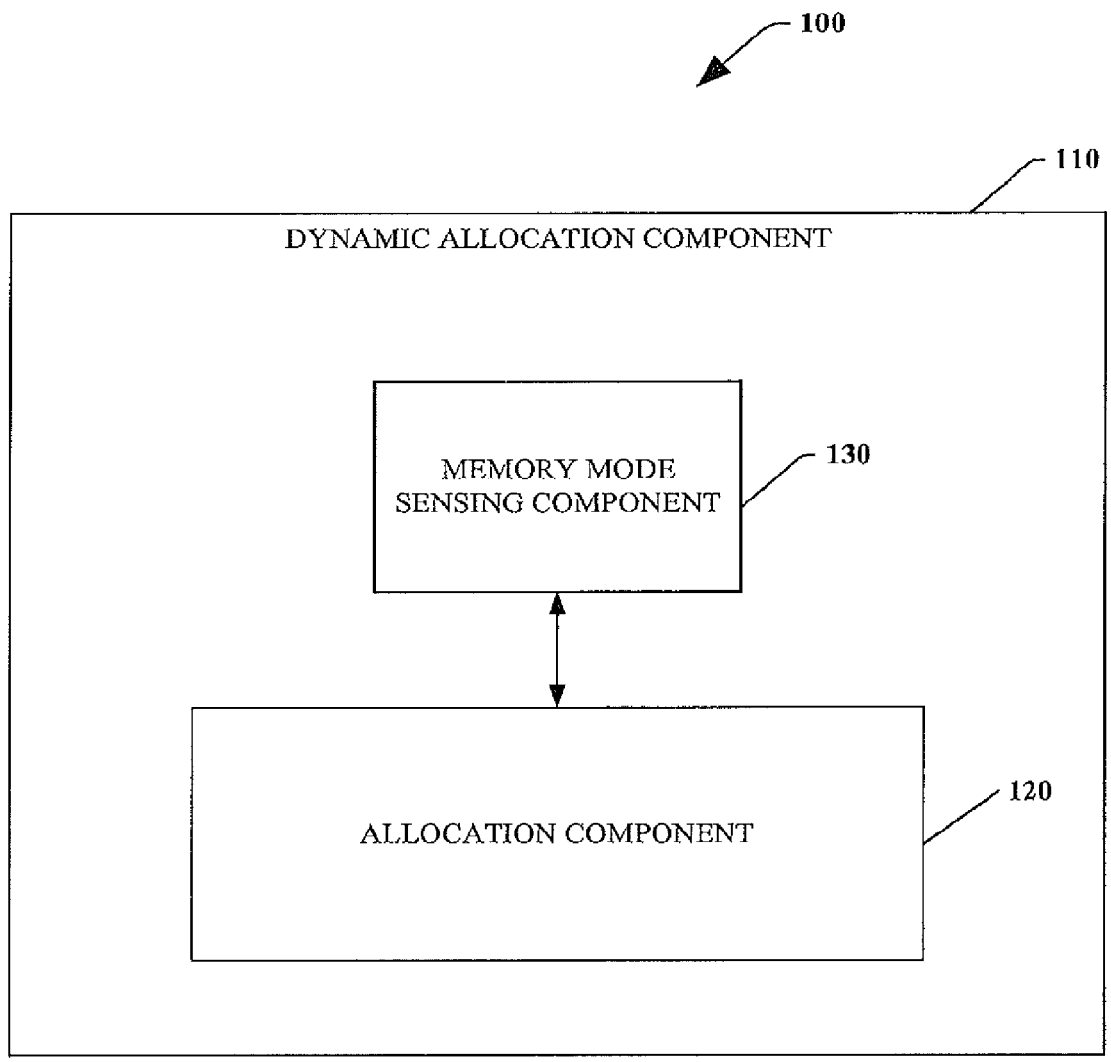
FIG. 1 is a high level diagram of a system that can facilitate dynamic allocation of battery capacity in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It is evident, however, that the disclosed subject matter can be practiced without these specific details. In other instances, well-known structures and devices are shown in block diagram form in order to facilitate describing the subject innovation.

Traditional battery allocation systems and methods simply allocate a set portion of a battery's capacity to maintain data in volatile memories without concern for the environment in which they are operating. For example, a common standard battery capacity retention benchmark is 72 hours of reserve. This can often use large amounts of battery capacity, for example 50% of battery capacity can be needed to power memory to prevent data loss for 72 hours. This can leave substantially less power available for device use. Effectively, the device user is carrying two logical batteries, a first to power the device for use and a second to power the device for data retention. Where an alternate power supply is available the capacity and form factor of the second virtual battery are unnecessarily large. Where a battery capacity can be dynamically allocated the use of the batteries can be better optimized. For example, a user can select to use the device longer where there is less need to maintain data for long periods of time, for example 72 hours, when, for example, a second battery is readily available. Further, smaller form factors can be achieved where a battery can be used for proportionally more device use and proportionally less data retention time.

In one aspect, dynamic battery allocation can depend at least in part on user interactions. For example, a user can indicate that it is more desirable to gain additional device use time at the expense of losing data preservation time. This can allow a device, for example, to reserve only 1 hour of data retention time rather than the usual 72 hours, leaving the remaining 71 hours of data retention power (e.g., the mAh that would have powered the memory for 71 hours can be used to power the device in use) as available for device use.

In another aspect, where nonvolatile memories are used, the memory can retain data even without power (e.g., flash memory, . . . ). Dynamic battery allocation can determine the type of memory being employed by the device and, for example, where nonvolatile memory is being used, adjust the reserve battery capacity to near 0% because of the nature of data retention on nonvolatile memories. This can leave substantially the entire battery capacity for used of the device.

In another aspect, where dynamic battery allocation is employed, a smaller form factor battery can be employed. In expectation of better battery optimization, a smaller form factor battery (assuming equivalent power density) can provide similar device use in many situations. For example, where the user regularly has alternate power supplies available (e.g., mains power, additional batteries, . . . ) a primary battery could regularly be drawn down to a much lower level before using the secondary power supply. If a user regularly works in an office where they are not more than, for example, 10 minutes from a recharge station, reserving 72 hours of battery life is generally unnecessary. In this example, a smaller battery can be employed where, for example, only 4 hours of reserve capacity is allocated.

In another aspect, where both volatile and nonvolatile memories are employed in a device, dynamic battery allocation can dynamically allocate power as previously discussed herein and can further communicate with a device operating system or application program interface (API) to indicate that additional use time can be achieved by moving data in volatile memories to nonvolatile memories. While performance with nonvolatile memories is generally slower than with volatile memories, the benefits of longer device use can outweigh the loss of performance from the user's perspective. For example, a commuter can desire more time reading an e-book at the expense of being able to flip through pages rapidly (e.g., e-book pages in volatile memories can typically flip faster than e-book pages in nonvolatile memories).

In another aspect, an inferential component of a dynamic finite power supply (FPS) system can determine more optimized dynamic power allocation based in part on inferences about the environment of the FPS. These inferences can be based on, for example, device use history, proximity of the user to alternate power supplies, the types and usages of data, among many others. For example, where a user regularly recharges a cell phone overnight by placing it in a charging cradle when leaving work, an inferential component can determine that it is more probable that the user will charge the phone at, for example, 5 pm and allow the user to run the device into reserve capacity near 4 pm. As a second example, where the user has critical data on the cell phone, for example, an unsaved text message containing a telephone number, the inferential component can determine the importance of the number by, for example, comparing it to saved telephone numbers, identifying the relationship of the send to the receiver (e.g., wife, boss, children, friends, telemarketer, . . . ). Where the inferential component infers that the number is highly important, additional reserve capacity to preserve the data can be allocated. Thus, for example, where the user normally recharges at 5 pm, and there is important volatile data, the user can be allowed to enter reserve capacity at 4:30 pm rather than 4 pm as in the prior example.

Dynamic finite power supply allocation can provide significant benefit to users of devices. These benefits can include better optimized finite power supply (FPS) utilization, smaller form factors, and improved confidence in the availability of a device (e.g., less fear that the device will simply shut off to preserve data, . . . ).

The subject innovation is hereinafter illustrated with respect to one or more arbitrary architectures for performing the disclosed subject matter. However, it will be appreciated by one of skill in the art that one or more aspects of the subject innovation can be employed in other memory system architectures and is not limited to the examples herein presented.

Turning to FIG. 1, illustrated is a high level diagram of a system 100 that can facilitate dynamic allocation of finite power supply capacity in accordance with an aspect of the subject matter disclosed herein. System 100, for example, can include a dynamic allocation component 110 that can determine the reserve FPS capacity. The dynamic allocation component 110 can determine the reserve FPS capacity based on, for example, the type of memory employed in a device, the use of the device memory, and the capacity of the FPS.

In an aspect, the dynamic allocation component 110 can include an allocation component 120 that can monitor the capacity of the FPS (e.g., total mAh), the condition of the FPS (e.g., discharge rate and health of the battery), and the operating environment of the FPS (e.g., temperature, humidity, . . . ) to facilitate determining a correlation between remaining FPS capacity, estimated remaining device use time (capacity to run the device), and estimated remaining reserve time (capacity to power memories for data retention). For example, an older battery operating in a cold environment can have an effective capacity that is significantly lower than the capacity when the battery was new and in a temperate environment, thus the allocation component 120 can determine that a larger percentage of the indicated total capacity of the older and colder battery should be reserved for data retention in that environment.

In another aspect, the dynamic allocation component 110 can include a memory mode sensing component 130 that can determine device memory types and usages (not illustrated) to facilitate dynamic FPS allocation in the system 100. The memory mode sensing component can determine the types of memories being used in a device, for example, if the memory is of a volatile or nonvolatile type. Where a nonvolatile type is employed in the electronic device, the memory mode sensing component 130 can indicate to the allocation component 120 that no data retention reserve capacity is needed because nonvolatile memory generally does not lose data when supply power is depleted. Further, where volatile, or a mix of volatile and nonvolatile, memory is employed in the device, the memory mode sensing component 130 can indicate to the allocation component 120 that some portion of FPS capacity can be reserved to retain data because data in a volatile memory can be lost when supply power is depleted.

Memory mode sensing component 130 can further determine the usage of memories employed in the electronic device. Memory usage can generally be divided into active and inactive use. Memory use can be said to be active when the memory contains data that is related to active use of the electronic device, for example, data related to a program in execution on the electronic device (e.g., a GPS map on a PDA that is being accessed by a user to get to a location, . . . ). Memory use can be said to be inactive when the memory contains data that is not related to active use of the electronic device, for example, data stored on the electronic device from a program no longer in execution (e.g., phone numbers stored to a phone book in a cell phone device and not being accessed by the user, a text document on a PDA that is not being accessed by the user, . . . ).

Where memory use is active, the memory mode sensing component 130 can indicate to the allocation component 120 that, for example, the battery is approaching a reserve power benchmark (e.g., 72 hours of data retention remaining) and that memory is in an active state, wherein a state can further include the type of memory being used. The allocation component can then determine how to allocate power such that the user can continue to use the device without losing data. This can occur in combination with determinations made based on the type of memory being employed as discussed herein. For example, a user with active volatile memory such as a GPS map on a PDA, can indicate to the allocation component 120 that they would like to continue using the GPS map on the PDA at the expense of reducing data retention time. The allocation component can then apportion a reduced reserve capacity to facilitate the user accessing the GPS map for an extended period.

Where memory use is inactive, the memory mode sensing component 130 can indicate to the allocation component 120 that, for example, the battery is approaching a reserve power benchmark and that memory is in an inactive state, wherein the state can further include the type of memory being used.

The allocation component 120 can then, for example, reserve a benchmark reserve capacity (e.g., 72 hours) or can reserve the remaining capacity where it has already dropped below the benchmark due to prior active state use as herein described (e.g., if the FPS is at 63 hours reserve capacity due to prior active memory use, when the device enters inactive memory use, the allocation component 120 can reserve the remaining 63 hours where this is below a 72 hour benchmark). The memory mode sensing component can employ timing information from a timer component (not shown) such that transitions from active to inactive modes are buffered to prevent a device from prematurely entering a low power state (e.g., where a user is still using the device but memory goes inactive due to the particulars of program execution, it can be preferable to keep the device active for a predetermined period of time).

Where memory types are of mixed mode (e.g., both volatile and nonvolatile) the dynamic allocation component 110 can communicate with a device or system to indicate that data in volatile memory can be shifted to nonvolatile memory to provide extended user access time. For example, where a PDA has both volatile memory (e.g., SRAM) and nonvolatile memory (e.g., flash memory) the dynamic allocation component can indicate to the PDA's operating system that employing, for example, the flash memory, can result in more use time. Further, the dynamic allocation component can indicate different proportions of volatile and nonvolatile allocation, such as, duplicating data in nonvolatile memory to prevent data loss, caching data in volatile memory to provide improved performance but storing data in nonvolatile memory, or storing all data in nonvolatile memory except for data needed for the current activity, among many others.

In another aspect, the allocation component 120 can further include an inferential component to facilitate determinations related to dynamically allocating FPS capacity. An inferential component can produce inferences based on, for example, prior device usage by one or more users, data/device/user semantics (e.g., amount of data, type of data, redundancy of data, prior data losses, ambient temperatures, battery performance, location of the user or device and/or proximity to known alternative power supplies, availability of secondary FPSs, or combinations thereof, among many others), user interactions, progress of a process (e.g., determining allocation based in part on how far along in a process the user, device, or system is), or combinations thereof, among others. For example, a cell phone with a GPS component (not illustrated) can determine that it is located in an airport and the inferential component (not illustrated) can infer that a mains power supply can be available. The inferential component can also review the current time, and the departure time of the user's flight to make an inference regarding 'even if mains power is available for a recharge of the FPS, will there be enough time before boarding to effect enough of a charge to maintain data'. The inferential component can then communicate with the allocation component 120 to better utilize the capacity of the FPS by allocating capacity either based entirely on the inferences formed or based at least in part on the inferences formed and, for example, additionally based in part on user interaction.

In another aspect, better utilization of FPS capacity can allow a smaller form factor FPS rather than longer usage times. If, for example, a battery can supply 4 hours of use and 72 hours of data retention with conventional capacity allocation and, for example, can provide 5 hours of use and 2 hours of data retention with dynamic capacity allocation, a smaller form factor battery can be used to provide 4 hours of use and 2 hours of data retention with dynamic capacity allocation.

Where a user device or system, for example, readily has alternative power sources available, a smaller capacity and smaller for factor battery can offer acceptable performance and a better solution for the end user.

System 100 can generally provide better utilization of a FPS. By providing better utilization of the FPS, system 100 can offer the end user more options as to how to tailor FPS capacity to their specific needs. Dynamic FPS capacity allocation can therefore enrich the end user experience with devices or systems employing system 100.

Figure 2:
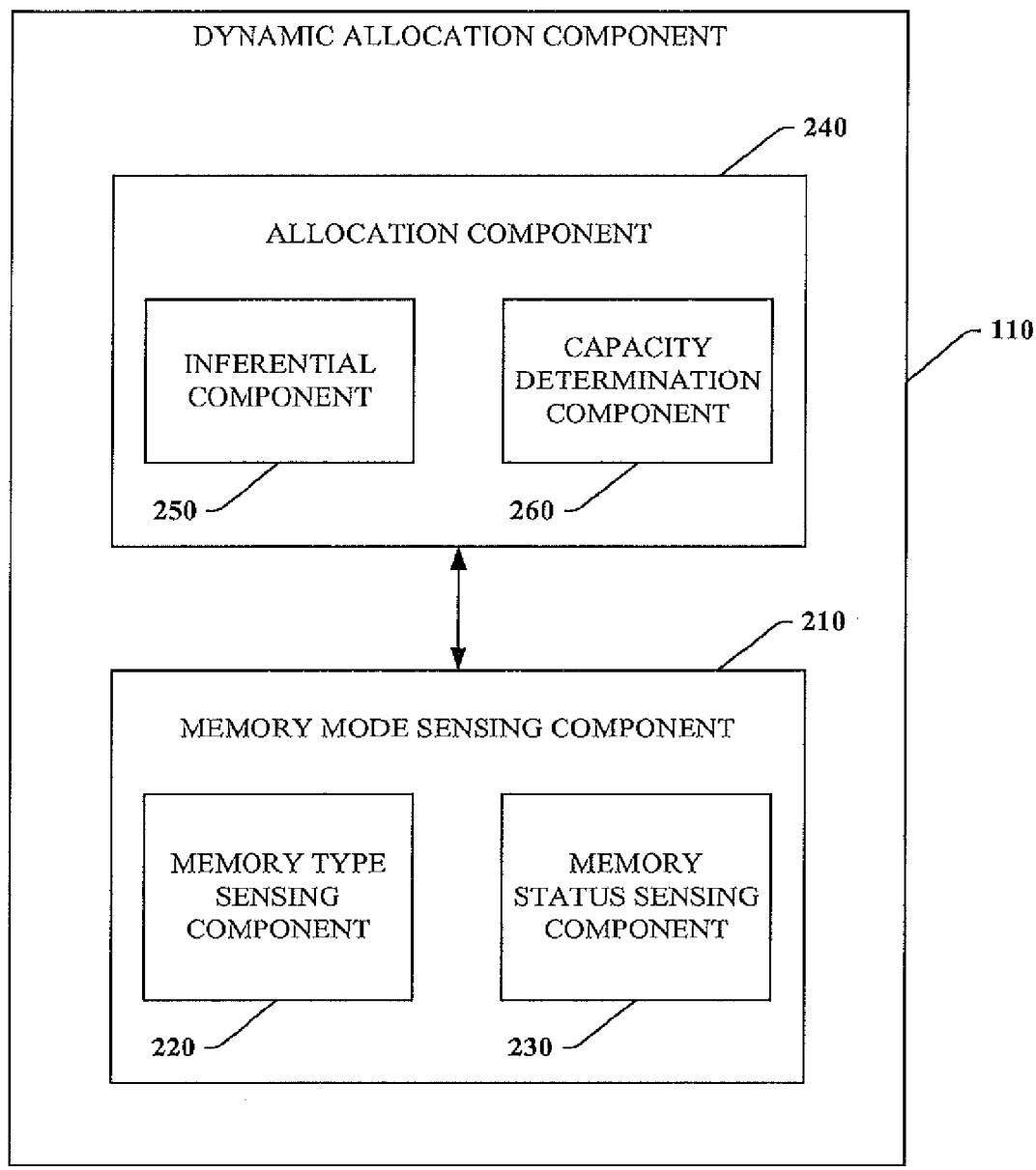
FIG. 2 is a simplified diagram of a dynamic allocation component that can facilitate allocation of battery capacity in accordance with an aspect of the subject matter disclosed herein.

Referring now to FIG. 2, illustrated is a simplified diagram of a dynamic allocation component 110 that can facilitate allocation of battery capacity in accordance with an aspect of the subject matter disclosed herein. The dynamic allocation component can determine allocation of FPS capacity to better utilize the FPS. The dynamic allocation component 110 can determine the reserve FPS capacity allocation based on, for example, the type of memory employed in a device, the use of the device memory, and the capacity of the FPS.

In one aspect, the dynamic allocation component 110 can include a memory mode sensing component 210 that can facilitate determinations of the device or system memory state. Memory mode sensing component 210, to this end, can further include a memory type sensing component 220. The memory type sensing component 220 can facilitate determining the type of memories used by an electronic device (e.g., volatile or nonvolatile memory). For example, memory type sensing component 220 can determine if an electronic device employs, for example, flash memory, SRAM, DRAM, EEPROM, magnetic RAM, micro-HDs, or combinations thereof among many others. Further, memory type sensing component 220 can be forward compatible by employing test methods for interacting with memories to determine if they retain memory with a depleted power supply (e.g., if the new memory is volatile or nonvolatile type memory).

Determining the type of device memory can facilitate allocation of battery capacity in accordance with an aspect because reserve capacity generally is not needed by nonvolatile memories. Therefore, where only nonvolatile memory is determined, the dynamic allocation component can determine not to reserve power capacity. Further, where both volatile and nonvolatile memory is determined to be present but only nonvolatile memory is in use (see memory mode sensing herein) the dynamic allocation component can determine not to reserve power capacity. Where volatile memory is present and is in use (see memory mode sensing herein) the dynamic allocation component can determine to reserve power capacity or alternatively to communicate with the electronic device or system to indicate that data should be moved to nonvolatile memory (where available) to gain additional use time. One of skill in the art will appreciate that additional dynamic FPS capacity allocation functionality can be derived based on the presence and use of volatile and/or nonvolatile memories in an electronic device or system and that these dynamic allocation functions are within the scope of the disclosed invention.

Further, memory mode sensing component 210 can further include a memory status sensing component 230 to facilitate determinations of the device or system memory state. Memory status sensing component 230 can facilitate determining the usage of memories employed by an electronic device (e.g., active or inactive memory usage). For example, memory status sensing component 230 can determine if memory is actively being used by, for example, a program in execution on the electronic device (not depicted). Memory status sensing component 230 can further include a timer component (not illustrated) that can at least determine elapsed times from a last memory state (e.g., where a device memory transitions from active to inactive status, a timer component can determine the time since the transition occurred). Where a memory status is active, for example, a user can be prompted to acknowledge that they would prefer to continue to use the device at the expense of lesser data retention times. Where a memory status is inactive, for example, the dynamic allocation component can reserve the remaining battery capacity for data retention or allow the device to run until a benchmark data retention capacity is reached. For example, if a user has placed a cell phone on a desk and the cell phone is on but not in use (e.g., memory status is inactive), when the cell phone reaches a benchmark reserve capacity (e.g., 72 hour data retention) the cell phone can be turned off to reserve the battery capacity. Further, for example, where the cell phone is in use, for example, for a conference call on speaker phone (e.g., the memory status is active), the user can indicate that the call should continue at the expense of data retention time.

Where memory status transitions between active and inactive states, a timer component can further facilitate dynamic FPS capacity allocation. Continuing the above example, where a the cell phone was being used for a conference call and the call ends (e.g., the memory status transitions from active to inactive) a time component can track the elapsed time and can delay switching off the phone, for example, for 10 minutes to allow the user to conduct any further actions with the phone as may be needed. After the elapsed time has reached a set point, the dynamic allocation component 110 can consider the cell phone in an inactive memory mode and turn it off to conserve the remaining battery capacity for data retention. This can occur where the phone has reached a benchmark (e.g., 72 hours data retention) or where the benchmark has been exceeded, for example, by the user allowing the device to enter the reserve capacity, for example, only 4 hours of data retention remain. Further, elapsed time triggers (e.g., 10 minutes in the example) need not be static intervals but can also be dynamic triggers, for example, time dependant (e.g., between 9 am and 5 pm the trigger is 10 minutes, between 5pm and midnight the trigger is 3 minutes, and between midnight and 9am the trigger is 30 seconds, . . . ).

The dynamic allocation component 110 can further include an allocation component 240 to facilitate allocation of battery capacity in accordance with an aspect of the subject matter disclosed herein. The allocation component generally can determine the real capacity of the FPS and determine appropriate allocation thereof. Real capacity of a FPS can be dependent on the age of the FPS, the recharge condition of the FPS, the environmental conditions of the FPS, and/or the level of power draw on the FPS, among others. The real capacity of the FPS can effectively dictate the maximum use times and the reserve times. For example, an old and worn battery operating in cold conditions is likely to have less power capacity than when the battery was new and in a warm environment. Therefore, it is likely that there will be less power capacity for use and less reserve power capacity available. Thus, allocation of the total real capacity can therefore be dependent on these types of variables.

Further, the allocation component 240 can include an inferential component 250 that can make inferences related to FPS capacity allocation based on numerous inputs as described herein. An inferential component 250 can produce inferences based on, for example, prior device usage by one or more users, data/device/user semantics (e.g., amount of data, type of data, redundancy of data, prior data losses, ambient temperatures, battery performance, location of the user or device and/or proximity to known alternative power supplies, availability of secondary FPSs, or combinations thereof, among many others), user interactions, progress of a process (e.g., determining allocation based in part on how far along in a process the user, device, or system is), or combinations thereof, among others. The allocation component 240 can determine FPS capacity allocations based in part on the inferences from the inferential component 250.

The allocation component 240 can also include a capacity determination component 260 that can facilitate determination of available power capacity. In addition to facilitating the determination of the real capacity (as discussed herein in regard to the allocation component 240 generally) the capacity determination component 260 can further facilitate determinations on how to allocate the real capacity. For example, capacity determination component 260 can calculate an optimized allocation of remaining FPS capacity. These exemplary calculations can include user weighted factors (e.g., the user sets allocation preferences in a user profile), can be reprogrammable (e.g., flash upgrades to the optimization algorithm), be based at least in part on inferential determinations (e.g., similar to the ability of the inference component 250 to make inferences), or combinations thereof among others.

Figure 3:
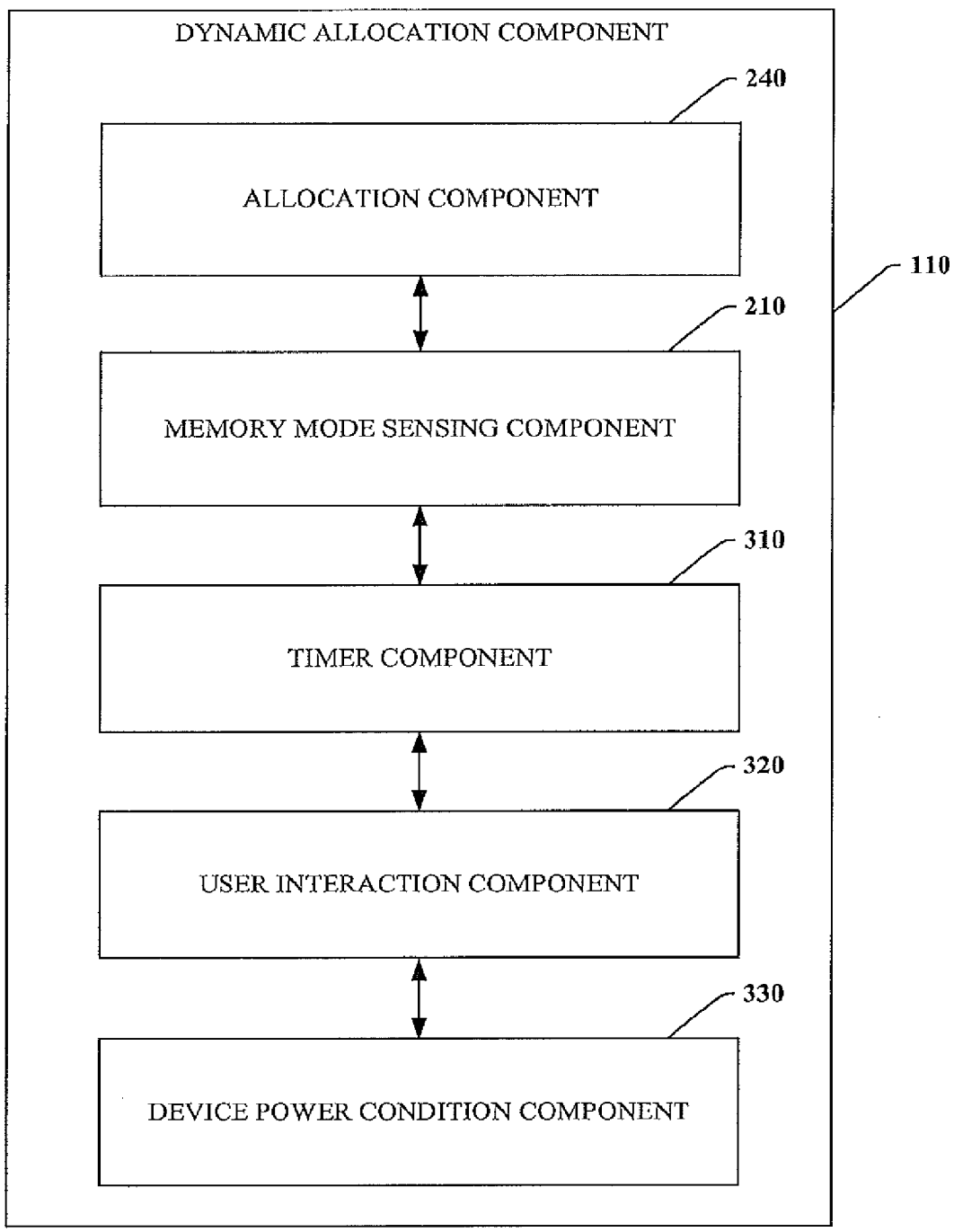
FIG. 3 is a diagram of a dynamic allocation component that can facilitate allocation of battery capacity in accordance with an aspect of the subject matter disclosed herein.

Referring now to FIG. 3, illustrated is a diagram of a dynamic allocation component 110 that can facilitate allocation of battery capacity in accordance with an aspect of the subject matter disclosed herein. In one aspect dynamic allocation component 110 can include a memory mode sensing component 210 as herein described, and an allocation component 240 as herein described to facilitate allocation of FPS capacity. The dynamic allocation component 110 can further include a timer component 310 that can determine, for example elapsed times between electronic device memory state transitions. For example, where an electronic device memory transitions between an active and an inactive status. The timing information can facilitate dynamic FPS capacity allocation by buffering the status changes such that the device or system user can continue to use a device when, for example, a program in execution completes and the memory status becomes inactive as discussed herein.

The dynamic allocation component 110 can include a user interaction component 320 to facilitate interacting with a user to aid in determinations of FPS capacity allocation. Where remaining FPS capacity reaches benchmarks (e.g., 72 hours of data retention) the user can interact with the dynamic allocation component 110 through the user interaction component 320 to indicate that it is desirable to continue to use the device into the reserve power capacity. For example, where 72 hours of data retention capacity remain, a cell phone user in a call can indicate that they would like to continue the call at the expense of data retention time, such that, for example, the call can continue until near exhaustion of the FPS and data in volatile memories can have only, for example, 5 minutes of data retention remaining, in which time the user can place the cell phone in a recharge cradle.

The user interaction component can also facilitate dynamic capacity allocation by employing a user profile to set preferences to guide the dynamic allocation. For example, a user can indicate in a profile that a data preservation capacity benchmark should be set at 1 hour of data retention. In this example, the dynamic allocation component 110 can then regularly allow the FPS to be drained to 1 hour of data retention capacity before allocating remaining capacity or interacting with the user for additional direction regarding allocation.

The dynamic allocation component 110 can include a device power condition component 330 to facilitate interacting with the electronic device or systems to aid in determinations of FPS capacity allocation. The device power condition component 330 can, for example, communicate with an electronic device operating system to indicate that transferring data from volatile to nonvolatile memory can increase use time of the device. Further, the device power condition component 330 can interact with a system or electronic device to power down unused device components to gain additional use time. For example, where a cell phone is not actively using a camera device, the device power condition component 330 can request that the camera device be powered down to preserve power where, for example, the reserve capacity benchmark has been reached. In a second example, in a PDA with a GPS receiver, the device power condition component 330 can request that the GPS be run in a lower power mode (assuming sufficiently strong GPS signals) to preserve power, or where the GPS is not in use, that the GPS be powered down to further conserve power for other usage of the PDA.

Figure 4:
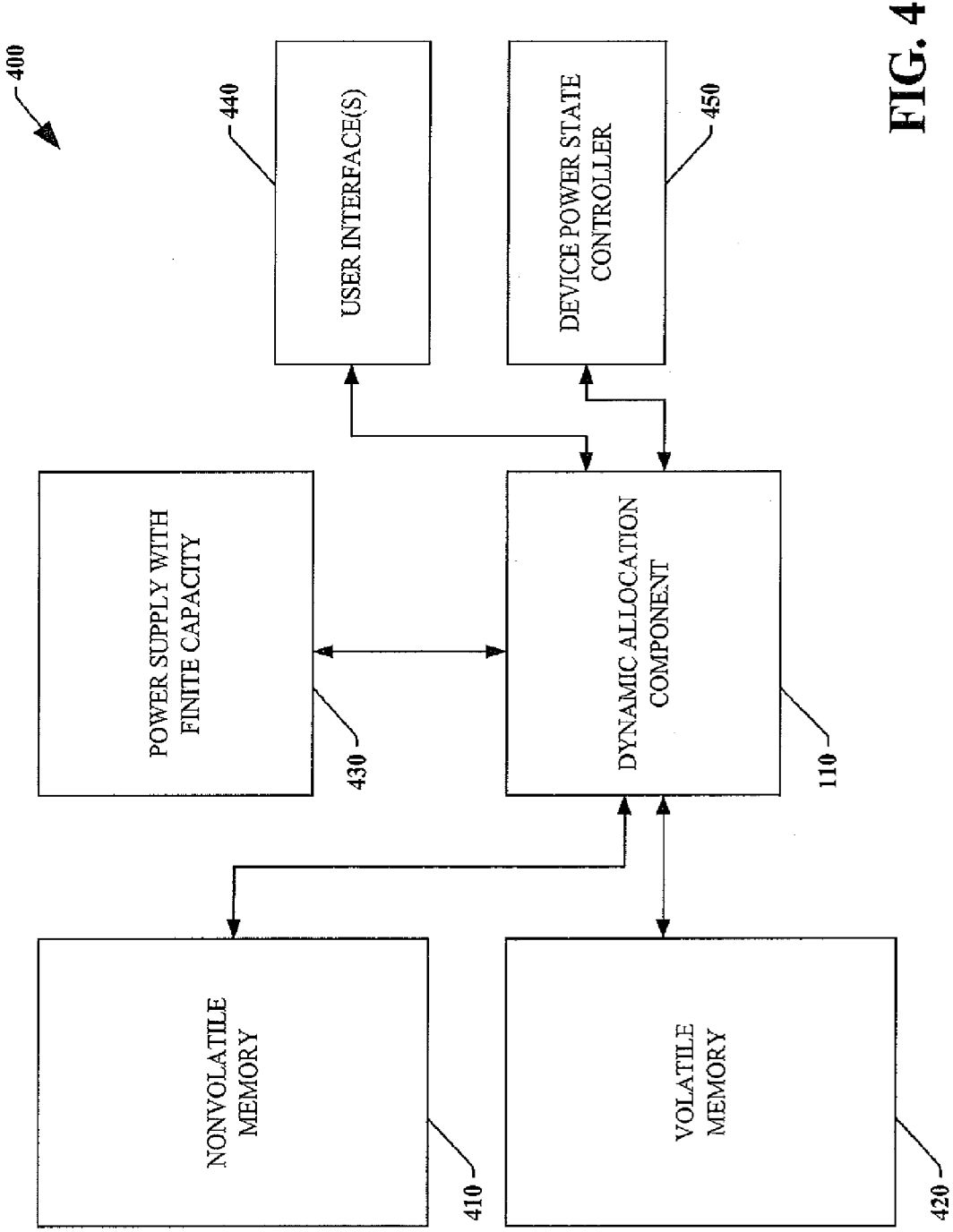
FIG. 4 illustrates a diagram of a system employing a dynamic allocation component that can facilitate allocation of battery capacity in accordance with an aspect of the disclosed subject matter.

Referring now to FIG. 4, illustrated is a diagram of a system 400 employing a dynamic allocation component 110 that can facilitate allocation of battery capacity in accordance with an aspect of the disclosed subject matter. A dynamic allocation component 110 can be communicatively coupled with a nonvolatile memory 410 and/or a volatile memory 420 such that the state of the memories can be determined (e.g., type and status (active or inactive)). Further, the memories 410 and 420 can be used to store user profiles, cache data for determinations, or other actions requiring memory, where separate memory is not included in the dynamic allocation component 110.

The dynamic allocation component 110 of system 400 can further be communicatively coupled to a power supply with finite capacity 430 (e.g., a FPS such as a electrochemical battery or capacitive power supply) such that the condition of the power supply 430 can be determined as herein discussed. The dynamic allocation component 110 can also be communicatively coupled with a user interface(s) 440 such that the user can be interacted with to aid in determining an appropriate FPS capacity allocation. For example, the user interface 440 can be the keypad and display of a cell phone or PDA. The user interface(s) 440 can also include dedicated dynamic capacity allocation user interfaces on devices or systems, for example a touch screen installed in a battery powered wireless router.

The dynamic allocation component 110 can further be communicatively coupled with a device power state controller 450 to facilitate dynamic FPS capacity allocation. A device power state controller 450 can be, for example, an interface with a device operating system such that the dynamic allocation component 110 can indicate when and how to power down features of the electronic device or the electronic device as a whole (not illustrated) as part of the dynamic FPS capacity allocation. For example, where the dynamic allocation component 110 includes a device power condition component 330 (see FIG. 3) a request can be made through the device power state controller 450 to power down a GPS receiver in a PDA, a cell phone digital camera, or the PDA or cell phone.

FIGS. 5-10 illustrate methodologies, flow diagrams, and/or timing diagrams in accordance with the disclosed subject matter. It is to be appreciated that the methodologies presented herein can incorporate actions pertaining to a neural network, an expert system, a fuzzy logic system, and/or a data fusion component, or a combination of these, which can generate diagnostics indicative of the optimization of FPS capacity allocation operations germane to the disclosed methodologies. Further, the prognostic analysis of this data can serve to better optimize FPS capacity allocation operations, and can be based on real time acquired data or historical data within a methodology or from components related to a methodology herein disclosed, among others. It is to be appreciated that the subject invention can employ highly sophisticated diagnostic and prognostic data gathering, generation and analysis techniques, and such should not be confused with trivial techniques such as simply powering down a device when a benchmark is reached.

For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states by way of a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
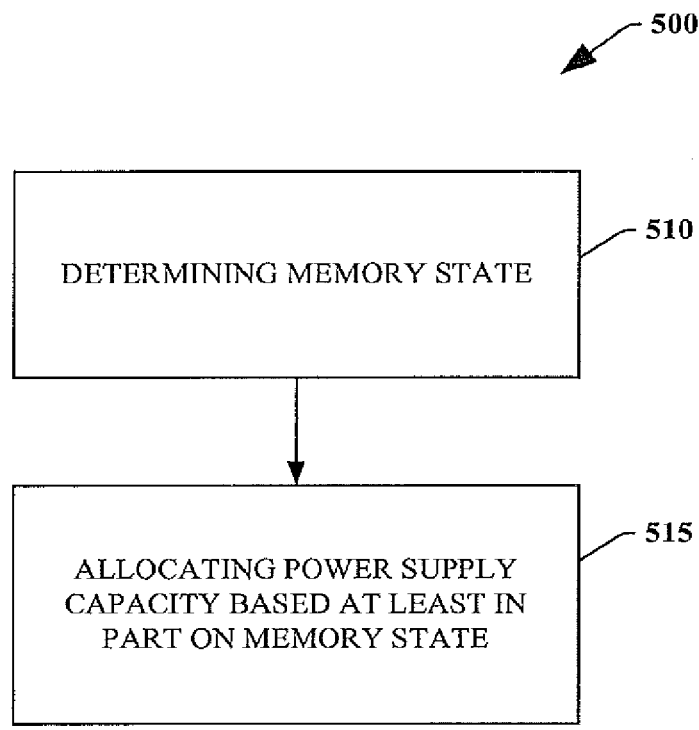
FIG. 5 illustrates a methodology that facilitates dynamic allocation of battery capacity in accordance with an aspect of the disclosed subject matter.

Referring now to FIG. 5, illustrated is a methodology 500 that facilitates dynamic allocation of battery capacity in accordance with an aspect of the disclosed subject matter. Conventionally, battery allocation methods determine a threshold power level at which an electronic device will be powered down to prevent loss of data stored in volatile memories for a set period of time, for example 72 hours. These conventional methodologies frequently underutilize the capacity of a battery system where alternative power supplies or a means of recharging a partially depleted power supply are readily available. For example, many systems will power down a user device with 50% of the charge capacity of the battery remaining to prevent data loss in a volatile memory for 72 hours. Where, for example a second battery is readily available, little more than a few minutes of reserve battery capacity are needed to prevent data loss and the remainder of the 72 hours of charge capacity could be better used to power the device in use.

The methodology 500 can facilitate dynamic allocation of FPS capacity by interacting with, or monitoring, electronic device or system components and user inputs to determine a more optimal utilization of FPS capacity when allocating reserve capacity for data preservation. At 510, methodology 500 can determine the state of device memories to determine how data is being stored and if and how it is subject to loss from depleting a finite power supply. Determining the memory state at 510 can include determining if device memories are volatile, nonvolatile, or a mix of volatile and nonvolatile. Determining the memory state at 510 can further include determining if device memory is being used in an active or inactive manner (e.g., where data is being stored in a memory related to a program in execution on the electronic device, among others).

At 515, methodology 500 can allocate FPS capacity based at least in part on the determination of the memory state. Allocating FPS capacity can include gathering and/or employing the determination of the memory state in calculations for determining a reserve capacity to allocate. Allocating FPS capacity can further include interacting with a user to aid in determining an appropriate reserve capacity, monitoring the condition of a FPS and power usage levels related to a FPS to aid in determining an appropriate reserve capacity, gathering information related to inferential determinations of expected device use, or combinations thereof among others. At this point, methodology 500 can end.

In an aspect of the disclosed invention, an electronic device or system, such as a cell phone, can employ methodology 500 to dynamically allocate battery capacity. For example, methodology 500 at 510 can determine that a cell phone uses volatile memory (e.g., RAM) and nonvolatile memory (e.g., a SIM card). At 510 it can further be determined that phone numbers are typically stored in the SIM card and that phone numbers and names being entered for storage (before they are stored) are kept in the cell phone RAM. A user in this example can have depleted the battery to, for example, 50% of total capacity (e.g., a benchmark for battery allocation) whereupon the methodology at 515 can inquire of the user if they wish to keep using the cell phone or if they prefer to power down to preserve any names and phone numbers in the RAM. If the user selects to keep using the cell phone, the methodology at 515 can continue interacting with the user as the battery is further depleted.

Continuing with the example, the methodology 500, at 515, can further communicate with the cell phone and request that data in the RAM be cached in the SIM card to prevent data loss should the battery become completely depleted. Moreover, at 515, inferences can be made based on, for example, the location of the cell phone user, the historical use of the cell phone by the user, the type of phone call the user may be on (e.g., based on an analysis of the phone number the user is connected to), or combinations thereof among others. These inferences can be employed at 515 in determining an appropriate allocation of the battery capacity. Based at least in part on the determined memory state and any additionally considered parameters and/or inferences a battery capacity can be allocated to preserve data in volatile memory and attempt to meet the cell phone user's desires.

In a second example, a PDA employing methodology 500 can use a smaller battery where methodology 500 provides improved utilization of the available battery capacity. At 510 the state of the electronic device memories can be determined as discussed herein. At 515 allocation of FPS capacity based at least in part on the determination of the electronic device memories can result in better utilized power supply capacity as herein discussed. Where a battery (or other FPS) is better utilized, the PDA can operate for a longer period of time where the allocation of reserve capacity results in reserving only enough capacity to allow a user to use an alternate power supply or begin recharging the FPS. Where a PDA can typically have a battery where only, for example, 50% of the battery is useable (e.g., the remaining 50% is allocated to preserving data in volatile memories) extending the useable portion of the battery, for example, to 80% (e.g., leaving only 20% for data preservation) can allow a smaller battery to be used (e.g., 80% of a smaller battery can be comparable to 50% of a larger battery).

Figure 6:
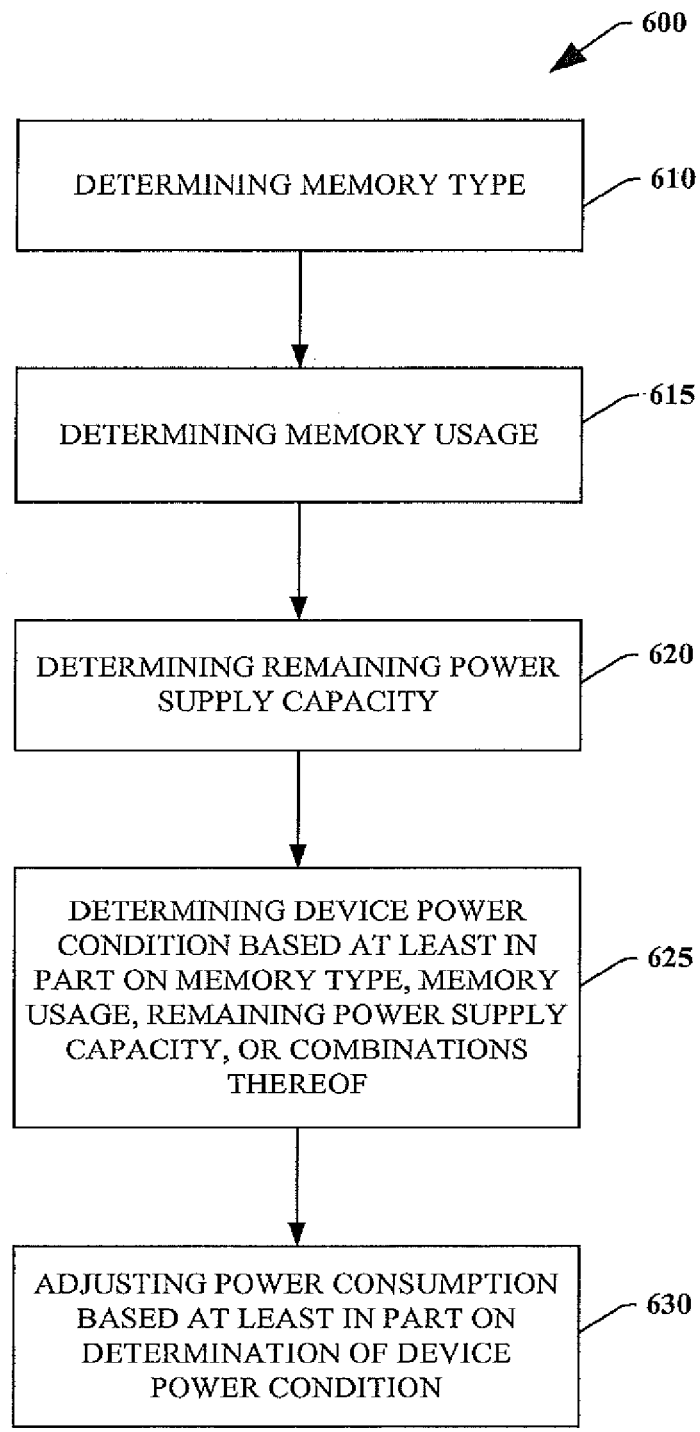
FIG. 6 illustrates a methodology that facilitates dynamic allocation of battery capacity in accordance with an aspect of the disclosed subject matter.

Referring now to FIG. 6, illustrated is a methodology that facilitates dynamic allocation of battery capacity in accordance with an aspect of the disclosed subject matter. At 610, the type of device memory can be determined. For example, it can be determined that a PDA employs both RAM (e.g., volatile memory) and a CF card (e.g., nonvolatile memory). At 615, the usage of the device memory can be determined. For example, where the PDA is running a program in execution, the PDA RAM can be active and the PDA CF card can be inactive. At 620, the remaining capacity of the FPS can be determined. For example, the PDA can have 50% capacity remaining in the PDA battery.

At 625, the device power condition can be determined. The device power condition can include determinations of, among others, the type of memory, the usage of the memory, and the amount of FPS capacity remaining For example, the PDA having both active volatile memory and inactive nonvolatile memory with 50% remaining battery capacity can, for example, result in a determination that the PDA is in use and should not be powered down to conserve the remaining 50% battery capacity for data retention in the volatile memory. Instead of powering down, for example, it can further be determined at 625 that user interaction should occur to query the PDA user about continued PDA use at the expense of reducing reserve capacity for data retention. Continuing with the example, the user can select to power down the PDA to preserve data, for example, for 72 hours on the 50% remaining charge, because the user does not have an alternate power supply available, for example, for at least another 48 hours.

At 630, methodology 600 can adjust the power consumption based at least in part on the determination of the device power condition. For example, where the PDA user selects to reserve capacity because an alternate power supply is not available as part of determining the device power condition at 625, the methodology 600, at 630, can allocate the remaining 50% battery capacity for data retention and power down the PDA accordingly. As a separate example, where a PDA user selects to continue using the PDA despite reducing the reserve capacity at 625, methodology 600, at 630, can communicate with the PDA, for example, with the operating system of the PDA, to request that data in the volatile memory be moved to the nonvolatile memory to prevent data loss should the battery become depleted. After the power consumption has been adjusted, at 630, based at least in part on the determination of the device power condition, methodology 600 can end.

One of skill in the art will appreciate that determining device power conditions at 625 can include additional information, for example, inferences (e.g., as discussed herein), among others. Where determinations of how to allocate FPS capacity dynamically are included in determining the device power condition, it is to be appreciated that these determinations are within the scope of the disclosed subject matter. Further, a multitude of actions can constitute adjusting the power consumption of a device or system based at least in part on the determination of device power conditions, for example, selectively powering down subcomponents of devices to conserve power, powering down entire devices to conserve power, transferring data between nonvolatile and volatile memories to prevent data loss or to improve performance so that an action can be completed more efficiently, caching nonvolatile data in volatile memory to increase efficiency, and many others. It is to be appreciated that these actions for adjusting power consumption are within the scope of the disclosed subject matter.

Figure 7:
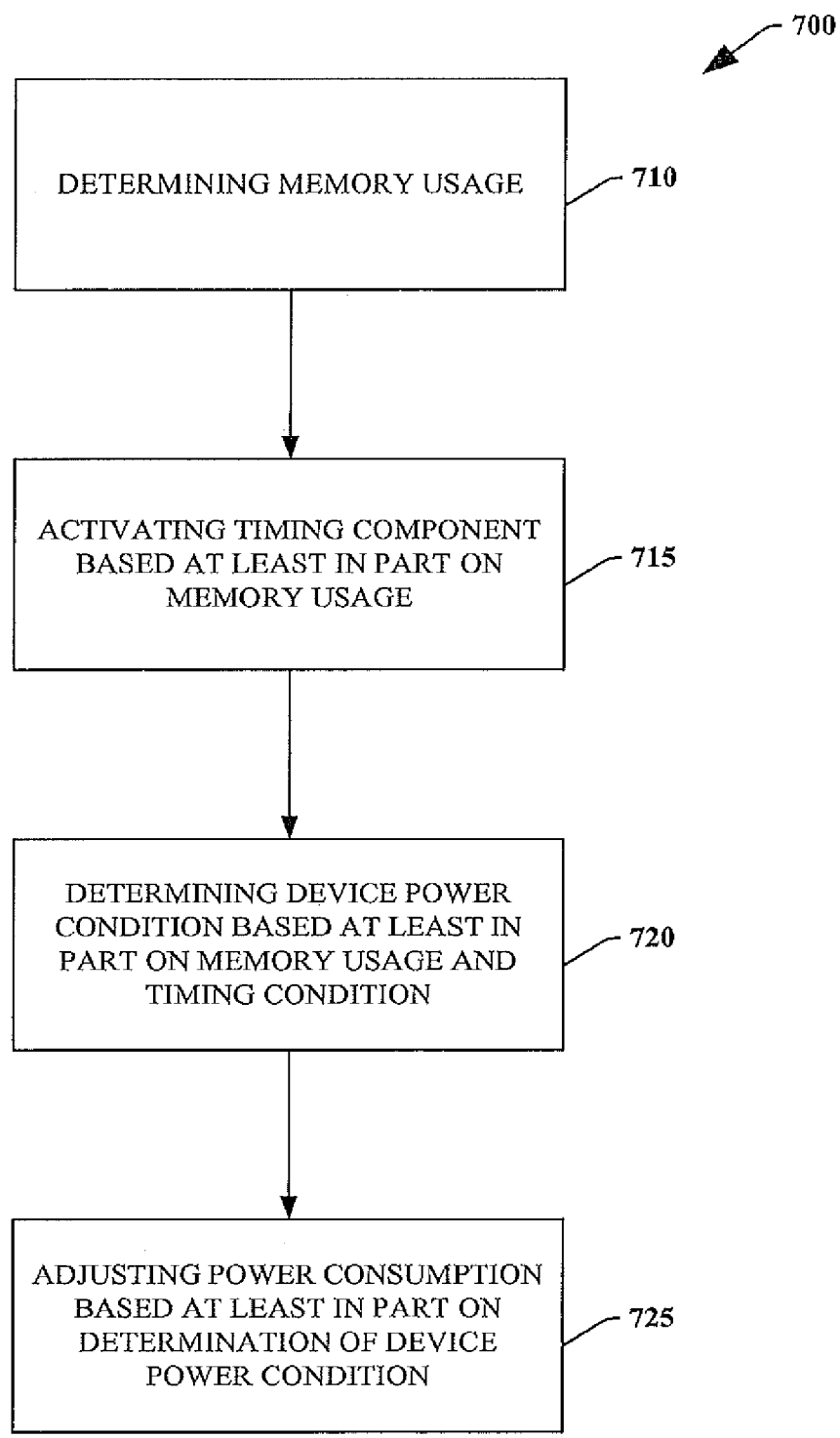
FIG. 7 illustrates a methodology that facilitates dynamic allocation of battery capacity in accordance with an aspect of the disclosed subject matter.

Referring now to FIG. 7, illustrated is a methodology that facilitates dynamic allocation of battery capacity in accordance with an aspect of the disclosed subject matter. At 710, the usage of the device memory can be determined. For example, where the PDA is running a program in execution, the PDA memory can be active. As a second example, where a cell phone is sitting in a belt holster waiting for an incoming call, the cell phone memory can be inactive. A determination of active or inactive memory can be based on use of the memory by the device, for example, in relation to a device program in execution being considered active memory. Similarly, memory storing data that is not related to active processes on a device can be considered inactive memory.

Where memory is active, it can be an indication that the device is in use and that the use should be considered in any dynamic allocation of FPS capacity. Similarly, where data is in inactive memory, the device can, for example, not be in use, but loss of the data is still generally undesirable and thus existence of data in an inactive memory can be considered in any dynamic allocation of FPS capacity.

At 715, a timing component can be activated as part of the methodology 700. The timing component can be activated based in part on the memory usage determination. For example, where memory use is active, and transitions to inactive, the determination of how to allocate FPS capacity can also change. Employing a timing component can buffer the transitions between active and inactive memory usage. For example, where a device has active memory, allocation of the remainder of the power supply capacity can be delayed. However, upon transitioning to inactive memory, the device can power down to reserve the remaining capacity. This can be undesirable where, for example, the transition between active and inactive memory can be transitory (e.g., coincidental termination of active device processes just before a new related process begins) or can be the result of the device user preparing to continue a process (e.g., an address card in a PDA is duplicated resulting in the memory going from active to inactive, the user then desires to edit the copy of the address card a new active memory state), among others. A timing component can allow a certain period of time, for example, after the memory goes inactive for the memory to go active again before assuming that the device is in an inactive memory state.

For example, where the timing component tracks time after memory use transitions, at 715, and an address in a PDA is copied, the memory can go from active to inactive. The timer can then begin. If the user begins editing the copy of the address card soon enough, the timer can be restarted at the transition from inactive to active memory. The timing information can thus be used in determining the allocation of FPS capacity, for example, by delaying powering down.

At 720, the device power condition can be determined based at least in part on the memory usage and the timing condition. Continuing with the above example, where the memory condition is inactive after the address card is copied and before the user begins editing the copied address card, and where the timing component conveys timing information, it can be determined, at 720, to delay powering down the PDA because the user can be still in the process of adding a contact to the PDA. At a later time after the user has edited and saved the copied address card (e.g., the memory transitions again from active to inactive) and the timer indicates that a sufficient time has elapsed, the determination at 720 can indicate that it is appropriate to power down the PDA to preserve data in the volatile memory.

Thus, at 725, the power consumption of the device can be adjusted based in part on the determination of the device power condition at 720. Continuing the prior example, where the determination at 720 was that the user can still be editing an address card (e.g., the timing component indicated an elapsed time that was sufficiently small), at 725, an adjustment can simply be changing nothing. Further, where at 720 the determination is made that the user has now completed any actions (e.g., the timing component indicates that sufficient time has elapsed since the last memory use transition) the PDA can be powered down to preserve remaining battery capacity for data retention. After this, method 700 can end.

One of skill in the art will appreciate that activating the timing component at 715 can result in returning different forms of timing information, for example, elapsed time, countdown time, or differential times, among others. It is to be appreciated that using any timing information related to transitions between active and inactive memory usage to aid in determining a device power condition is within the scope of the disclosed subject matter.

Figure 8:
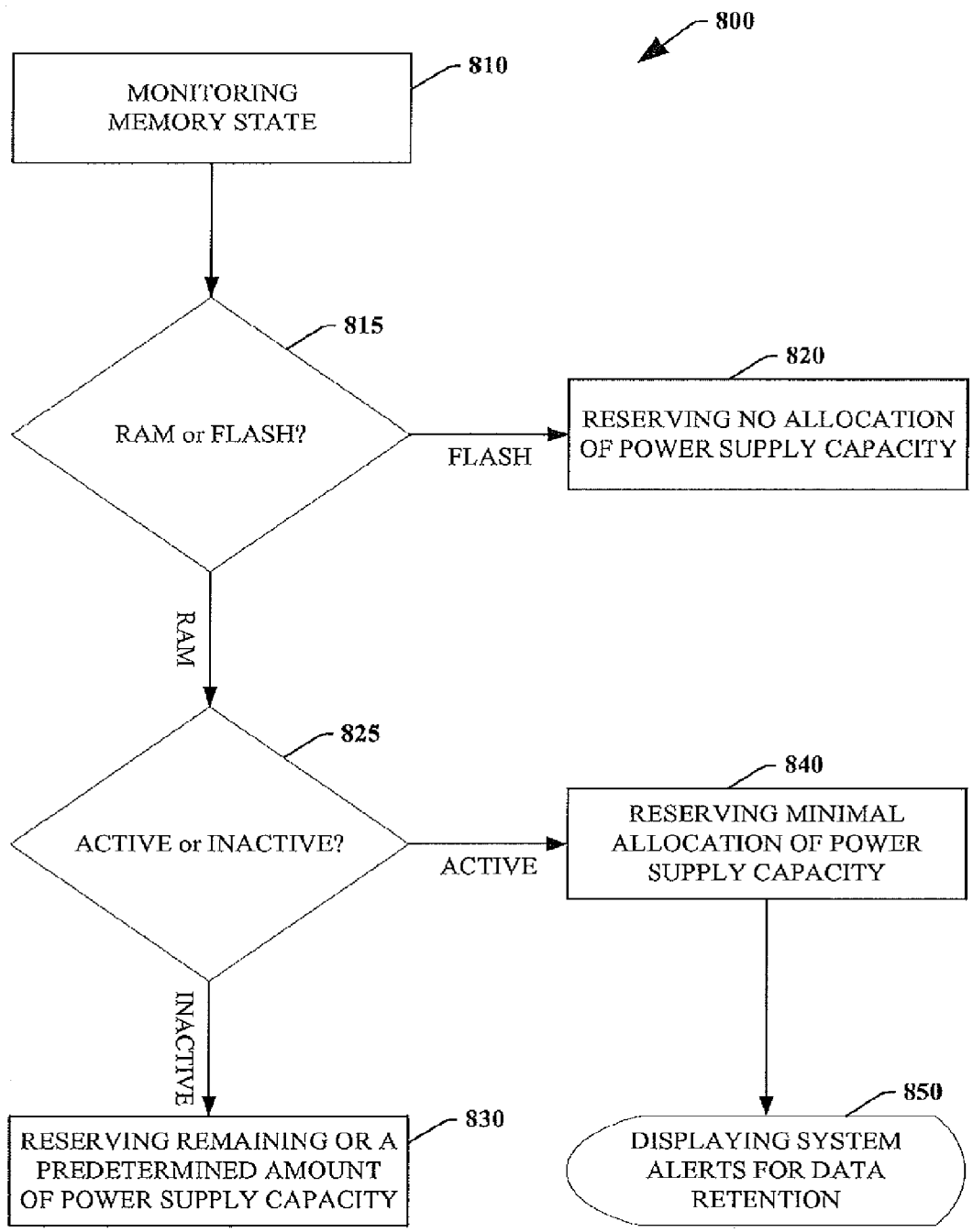
FIG. 8 illustrates a methodology that facilitates dynamic allocation of battery capacity in accordance with an aspect of the disclosed subject matter.

Referring now to FIG. 8, illustrated is a methodology 800 that facilitates dynamic allocation of battery capacity in accordance with an aspect of the disclosed subject matter. At 810 the state of the device memories can be monitored. For example, a PDA can have both RAM (e.g., volatile) and flash memory (e.g., nonvolatile). At 815 a determination can be made as to the type of memory employed, for example, it can be determined if RAM or flash memory is being employed. At 820, where flash memory is being employed in the electronic device, the dynamic FPS capacity allocation can result in reserving no allocation of power supply capacity because data in a nonvolatile flash memory is generally insensitive to loss of power.

However if at 815, it is determined that RAM (e.g., volatile memory) is being employed, it can next be determined, at 825, if the RAM is in active or inactive use. For example, where data is stored in the RAM and is related to a program in execution on the electronic device, the RAM can be in an active state (e.g., as herein discussed extensively). At 830, where it has been determined that RAM use is inactive, the remaining FPS capacity can be reserved to retain the data in the volatile RAM or a predetermined amount of FPS capacity can be reserved, for example, 50% can be reserved.

However, if at 825, it is determined that the RAM is active, at 840 a minimal allocation of power supply capacity can be reserved. Further, at 850, system alerts can be displayed to notify the user that data retention can be compromised by continued use (e.g., notification that the reserve capacity is being depleted in favor of continued use). After this, methodology 800 can end.

It is to be appreciated that more complex determinations can be made regarding volatile, nonvolatile, active, inactive, and combinations thereof, memory conditions as discussed at length herein. It is to be further appreciated that different amounts of capacity can be allocated in response to these determinations as also discussed at length herein. It is to be still further appreciated that user interactions can be effected at action block 850 in addition to displaying system alerts. Moreover, it will be appreciated that inferential actions can be easily incorporated into the method as depicted. All such modifications of method 800 are considered to be within the scope of the disclosed subject matter.

Figure 9:
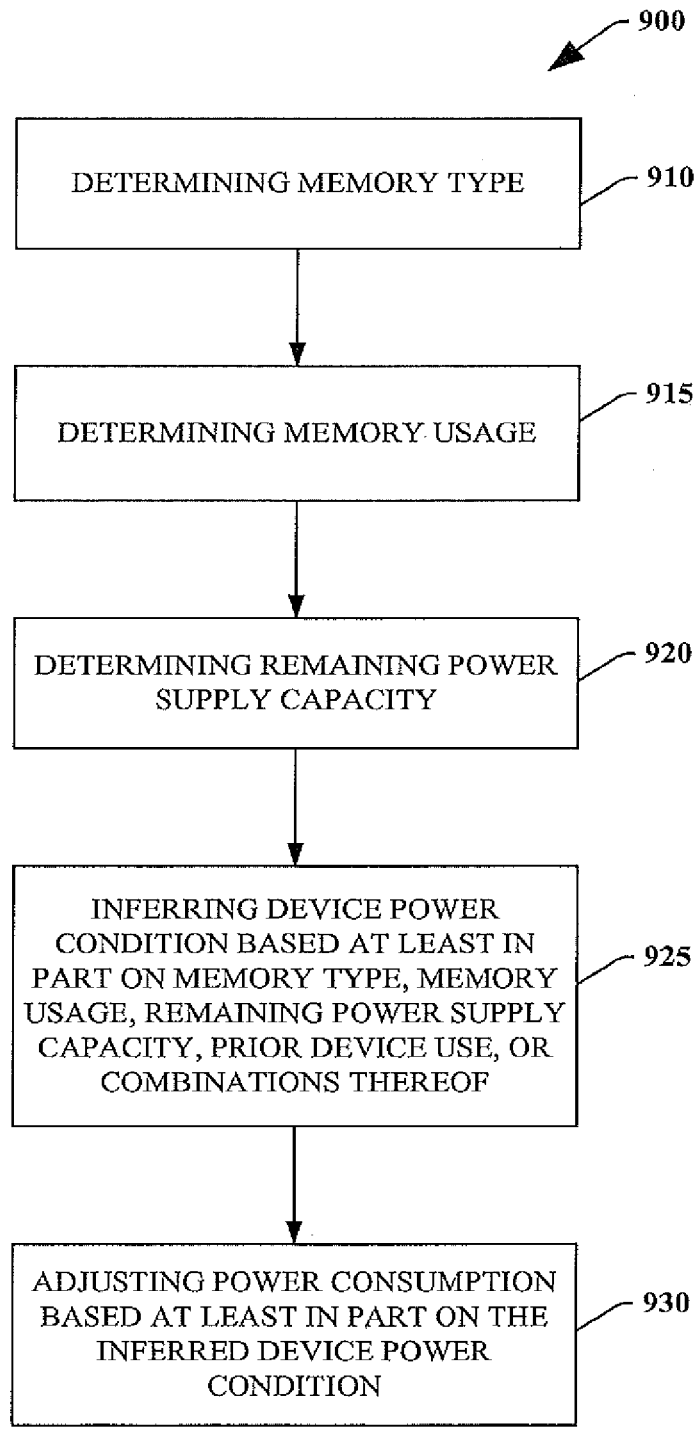
FIG. 9 illustrates a methodology that facilitates inferential dynamic allocation of battery capacity in accordance with an aspect of the disclosed subject matter.

Referring now to FIG. 9, illustrated is a methodology 900 that facilitates inferential dynamic allocation of battery capacity in accordance with an aspect of the disclosed subject matter. At 910, the type of device memory can be determined. For example, it can be determined that a PDA employs both RAM (e.g., volatile memory) and a flash memory (e.g., nonvolatile memory). At 915, the usage of the device memory can be determined. For example, where the PDA is running a program in execution, the PDA RAM can be active and the PDA flash memory can be inactive. At 920, the remaining capacity of the FPS can be determined. For example, the PDA can have 50% capacity remaining in the PDA battery.

At 925, the device power condition can be inferred. The device power condition can include inferences based on, among others, the type of memory, the usage of the memory, the amount of FPS capacity remaining, prior device usage by one or more users, data/device/user semantics (e.g., amount of data, type of data, redundancy of data, prior data losses, ambient temperatures, battery performance, location of the user or device and/or proximity to known alternative power supplies, availability of secondary FPSs, or combinations thereof, among many others), user interactions, progress of a process (e.g., determining allocation based in part on how far along in a process the user, device, or system is), or combinations thereof, among others. For example, the PDA having both active volatile memory and inactive nonvolatile memory with 50% remaining battery capacity can, for example, result in an inference that the PDA is in use and should not be powered down to conserve the remaining 50% battery capacity for data retention in the volatile memory. Instead of powering down, for example, it can further be inferred at 925 that based on the type of data involved in the user interaction) that the PDA user can be allowed to continue with the use of the PDA at the expense of reducing reserve capacity for data retention (e.g., the user is writing a memo to his employer on the PDA, the inference can be based on an email to an employer is more important that a minor reduction in the data preservation power reserve).

At 930, methodology 900 can adjust the power consumption based at least in part on the inferred device power condition. For example, where the PDA user is emailing his employer, this can be included as part of the inferred device power condition at 925 such that the methodology 900, at 930, can allocate less remaining battery capacity for data retention and allow the user to continue using the PDA. As a separate example, where a PDA user completes the email to his employer and then begins surfing the web for golf clubs, the inference made at 925 can infer that the device power condition should preferably preserve data over allowing continued PDA use, whereby, methodology 900, at 930, can power down the PDA to reserve capacity for data retention. After the power consumption has been adjusted, at 930, based at least in part on the inferred device power condition, methodology 900 can end.

One of skill in the art will appreciate that inferring device power conditions at 925 can include additional information as discussed herein. Where inferences are included in allocating the FPS capacity dynamically through inferring the device power condition, it is to be appreciated that these inferences are within the scope of the disclosed subject matter. Further, a multitude of actions can constitute adjusting the power consumption of a device or system based at least in part on the inferred device power conditions, for example, selectively powering down subcomponents of devices to conserve power, powering down entire devices to conserve power, transferring data between nonvolatile and volatile memories to prevent data loss or to improve performance so that an action can be completed more efficiently, caching nonvolatile data in volatile memory to increase efficiency, and many others. It is to be appreciated that these actions for adjusting power consumption are within the scope of the disclosed subject matter.

Figure 10:
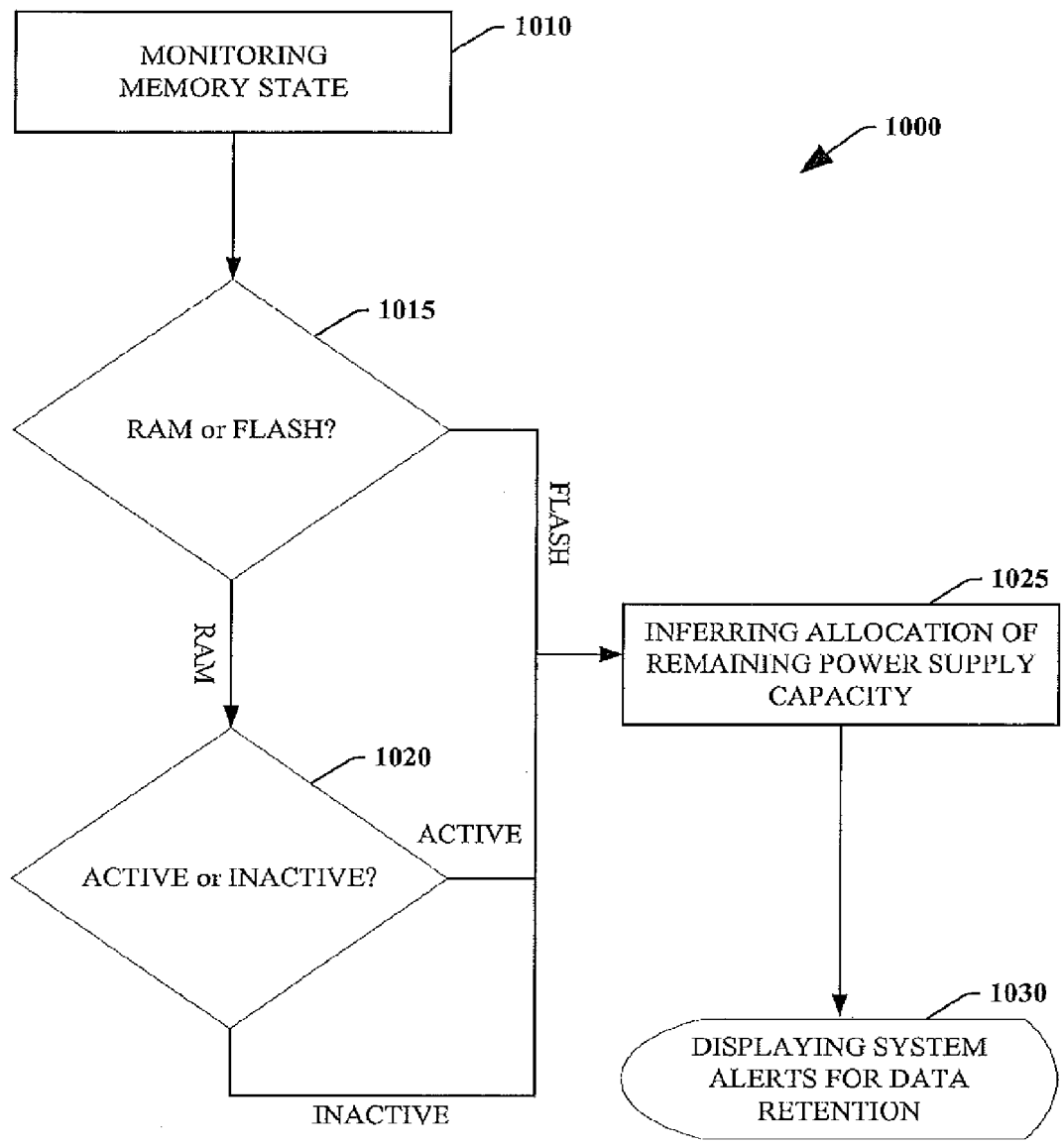
FIG. 10 illustrates a methodology that facilitates inferential dynamic allocation of battery capacity in accordance with an aspect of the disclosed subject matter.

Referring to FIG. 10, illustrated is a methodology that facilitates inferential dynamic allocation of battery capacity in accordance with an aspect of the disclosed subject matter. At 1010 the state of the device memories can be monitored. For example, a PDA can have both RAM (e.g., volatile) and flash memory (e.g., nonvolatile). At 1015 a determination can be made as to the type of memory employed. For example, it can be determined if RAM or flash memory is being employed. However if at 1015, it is determined that RAM (e.g., volatile memory) is being employed, it can next be determined, at 1020, if the RAM is in active or inactive use. For example, where data is stored in the RAM and is related to a program in execution on the electronic device, the RAM can be in an active state, as herein discussed. Also for example, where data is stored in the RAM and is not related to a program in execution on the electronic device, the RAM can be in an inactive state, as herein discussed.

At 1025, from the determinations at action blocks 1015 and 1020, the memory states can be employed in inferring an allocation of the remaining power supply capacity. These inferences at 1025, can be based on, among others, the type of memory, the usage of the memory, the amount of FPS capacity remaining, prior device usage by one or more users, data/device/user semantics (e.g., amount of data, type of data, redundancy of data, prior data losses, ambient temperatures, battery performance, location of the user or device and/or proximity to known alternative power supplies, availability of secondary FPSs, or combinations thereof, among many others), user interactions, progress of a process (e.g., determining allocation based in part on how far along in a process the user, device, or system is), or combinations thereof, among others. At 1030, system alerts can be displayed. After this, methodology 1000 can end.

It is to be appreciated that more complex determinations can be made regarding volatile, nonvolatile, active, inactive, and combinations thereof, memory conditions as discussed at length herein. It is to be further appreciated that different amounts of capacity can be allocated in response to these determinations as also discussed at length herein. It is to be still further appreciated that user interactions can be effected at action block 1030 in addition to displaying system alerts. All such modifications of method 1000 are considered to be within the scope of the disclosed subject matter.

Figure 11:
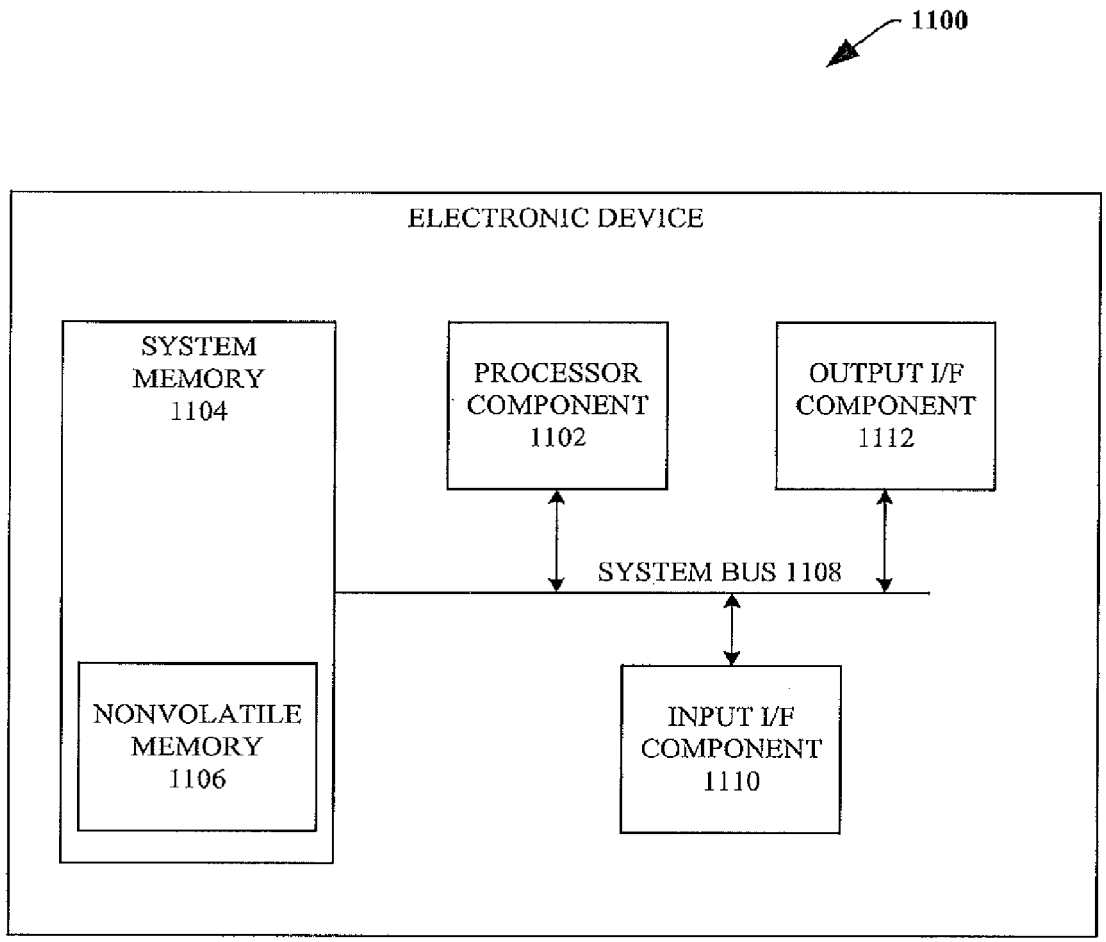
FIG. 11 illustrates a block diagram of an exemplary electronic device that can utilize dynamic allocation or inferential dynamic allocation of battery capacity in accordance with an aspect of the disclosed subject matter.

Referring to FIG. 11, illustrated is a block diagram of an exemplary, non-limiting electronic device 1100 that can include a memory device that can store data in accordance with one aspect of the disclosed subject matter. The electronic device 1100 can include, but is not limited to, a computer, a laptop computer, network equipment (e.g. routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCM-CIA) card, a trusted platform module (TPM), a Hardware Security Module (HSM), set-top boxes, a digital video recorder, a gaming console, a navigation system (e.g., global position satellite (GPS) system), secure memory devices with computational capabilities, devices with tamper-resistant chips, an electronic device associated with an industrial control system, an embedded computer in a machine (e.g., an airplane, a copier, a motor vehicle, a microwave oven), and the like.

Components of the electronic device 1100 can include, but are not limited to, a processor component 1102, a system memory 1104 (with nonvolatile memory 1106), and a system bus 1108 that can couple various system components including the system memory 1104 to the processor component 1102. The system bus 1108 can be any of various types of bus structures including a memory bus or memory controller, a peripheral bus, or a local bus using any of a variety of bus architectures.

Electronic device 1100 can typically include a variety of computer readable media. Computer readable media can be any available media that can be accessed by the electronic device 1100. By way of example, and not limitation, computer readable media can comprise computer storage media and communication media. Computer storage media can include volatile, non-volatile, removable, and non-removable media that can be implemented in any method or technology for storage of information, such as computer readable instructions, data structures, program modules or other data. Computer storage media includes, but is not limited to, RAM, ROM, EEPROM, nonvolatile memory 1106 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1100. Communication media typically can embody computer readable instructions, data structures, program modules or other data in a modulated data signal such as a carrier wave or other transport mechanism and includes any information delivery media.

The system memory 1104 can include computer storage media in the form of volatile and/or nonvolatile memory 1106 (e.g., memory component 110, adapted versions of generic memory system 300, etc.). A basic input/output system (BIOS), containing the basic routines that help to transfer information between elements within electronic device 1100, such as during start-up, can be stored in memory 1104. Memory 1104 can typically contain data and/or program modules that can be immediately accessible to and/or presently be operated on by processor component 1102. By way of example, and not limitation, system memory 1104 can also include an operating system, application programs, other program modules, and program data.

The nonvolatile memory 1106 can be removable or non-removable. For example, the nonvolatile memory 1106 can be in the form of a removable memory card or a USB flash drive. In accordance with one aspect, the nonvolatile memory 1106 can include flash memory (e.g., single-bit flash memory, multi-bit flash memory), ROM, PROM, EPROM, EEPROM, or NVRAM (e.g., FeRAM), or a combination thereof, for example. Further, the flash memory can be comprised of NOR flash memory and/or NAND flash memory.

A user can enter commands and information into the electronic device 1100 through input devices (not shown) such as a keypad, microphone, tablet or touch screen although other input devices can also be utilized. These and other input devices can be connected to the processor component 1102 through input interface component 1112 that can be connected to the system bus 1108. Other interface and bus structures, such as a parallel port, game port or a universal serial bus (USB) can also be utilized. A graphics subsystem (not shown) can also be connected to the system bus 1108. A display device (not shown) can be also connected to the system bus 1108 via an interface, such as output interface component 1112, which can in turn communicate with video memory. In addition to a display, the electronic device 1100 can also include other peripheral output devices such as speakers (not shown), which can be connected through output interface component 1112.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

As utilized herein, terms "component," "system," "interface," and the like, can refer to a computer-related entity, either hardware, software (e.g., in execution), and/or firmware. For example, a component can be, but is not limited to being, a process running on a processor, a processor, a circuit, a collection of circuits, an object, an executable, a thread of execution, a program, and/or a computer. By way of illustration, both an application running on a server and the server can be a component. One or more components can reside within a process and a component can be localized on one computer and/or distributed between two or more computers.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Artificial Intelligence

Artificial intelligence based systems (e.g., explicitly and/or implicitly trained classifiers) can be employed in connection with performing inference and/or probabilistic determinations and/or statistical-based determinations as in accordance with one or more aspects of the disclosed subject matter as described herein. As used herein, the term "inference," "infer" or variations in form thereof refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

For example, an artificial intelligence based system can evaluate current or historical evidence associated with data access patterns (e.g., prior device usage by one or more users, data/device/user semantics (e.g., amount of data, type of data, redundancy of data, prior data losses, ambient temperatures, battery performance, location of the user or device and/or proximity to known alternative power supplies, availability of secondary FPSs, or combinations thereof, among many others), user interactions, progress of a process (e.g., determining allocation based in part on how far along in a process the user, device, or system is), or combinations thereof, among others, . . . ) and based in part in such evaluation, can render an inference, based in part on probability, regarding, for instance, how much capacity to allocate to data retention based, when to communicate with a device to move data from volatile memory to nonvolatile memory, what data is acceptable to subject to a possibility of loss by extending user time, or many others. One of skill in the art will appreciate that intelligent and/or inferential systems can facilitate further optimization of the disclosed subject matter and such inferences can be based on a large plurality of data and variables all of with are considered within the scope of the subject innovation.

What has been described above includes examples of aspects of the disclosed subject matter. It is, of course, not possible to describe every conceivable combination of components or methodologies for purposes of describing the disclosed subject matter, but one of ordinary skill in the art will recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates dynamic allocation of battery capacity of a device, the system comprising:
    a memory mode sensing component that determines a state of one or more memories employed in the device, wherein a portion of a finite power supply corresponding to the battery capacity of the device is reserved to power the one or more memories;
    a user interaction component that facilitates interaction of a user with the device; and
    an allocation component that allocates some portion of the finite power supply reserved for the one or more memories to power the device based on the determination of both the state of the one or more memories and the interaction of the user with the device.

2. The system of claim 1 wherein the memory mode sensing component determines the state of one or memories based on memory types, memory usage, and remaining power supply capacity available to the one or more memories, and further wherein the memory types are at least one of volatile memories, nonvolatile memories, active memories, inactive memories, or combinations thereof.

3. The system of claim 2, further comprising:
    a device power condition component that determines power condition of the device based at least in part on the memory types, memory usages, and remaining power supply capacity, wherein the allocation component allocates some portion of the finite power supply by adjusting a power consumption of the device based on the power condition of the device.

4. The system of claim 3, wherein the device power condition component facilitates interaction with the device or system by way of an application program interface, or the like.

5. The system of claim 3, wherein the allocation component transfers data from a volatile memory to a non-volatile memory to allocate some portion of the finite portion supply reserved for the one or more memories to power the device when the memory types of one or memories are determined to be volatile memories.

6. The system of claim 1, wherein the user interaction component facilitates interaction of the user with the device by way of a user interface, a system user interface, or the like.

7. The system of claim 6, wherein the user interface, the system user interface, or the like, is a graphical user interface or command line interface.

8. The system of claim 1, wherein the device comprises at least one of a computer, a laptop computer, network equipment, a media player, a media recorder, a television, a smart card, a phone, a cellular phone, a smart phone, an electronic organizer, a personal digital assistant, a portable email reader, a digital camera, an electronic game, an electronic device associated with digital rights management, a Personal Computer Memory Card International Association (PCMCIA) card, a trusted platform module (TPM), a Hardware Security Module (HSM), set-top boxes, a digital video recorder, a gaming console, a navigation system, a secure memory device with computational capabilities, a device with at least one tamper-resistant chip, an electronic device associated with industrial control systems, or an embedded computer in a machine, or a combination thereof, wherein the machine comprises one of an airplane, a copier, a motor vehicle, or a microwave oven.

9. A method that facilitates dynamic allocation of battery capacity of a device, the method comprising:
reserving a portion of a finite power supply corresponding to the battery capacity to power one or more memories employed in the device;
determining a state of the one or more memories;
determining a user interaction parameter based on the interaction of the user with the device; and
allocating some of the portion of the finite power supply reserved for the one or more memories to power the device based on the determination of both the state of the one or more memories and the user interactions parameter.

10. The method of claim 9, wherein the determination of the state of the one or more memories includes determining memory types of the one or memories, wherein the memory types are at least one of volatile memories, nonvolatile memories, active memories, inactive memories, or combinations thereof.

11. The method of claim 10, wherein:
determining the state of one or more memories further comprises determining the memory types, determining the memory usages, determining the remaining power supply capacity available to the one or more memories, and determining a power condition of the device based at least in part on the memory types, memory usages, and remaining power supply capacity; and
allocating some portion of the finite power supply to the device further comprises adjusting a power consumption of the device based on the determination of the power condition of the device.

12. The method of claim 11, wherein the allocated portion of the finite power supply is at or near 0% when the memory types are only nonvolatile or when the memory usages employ only persistent memory during use.

13. The method of claim 11, wherein the allocated portion of the finite power supply is based at least in part on communicating information related to the finite power supply allocation when the memory usages include active usages.

14. The method of claim 11, wherein the allocated portion of the finite power supply is based at least in part on a predetermined amount of power supply capacity or a remaining amount of power supply capacity when the memory usages include inactive usages.

15. The method of claim 10, wherein allocating some portion of the finite power supply reserved for the one or more memories further comprises transferring data from a volatile memory to a non-volatile memory when the memory types of one or more memories are determined to be volatile memories.

* * * * *